UNITED STATES PATENT OFFICE.

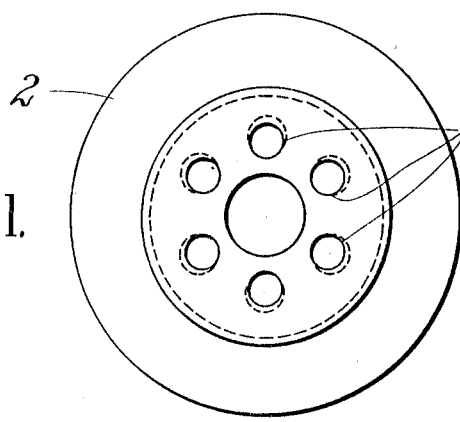
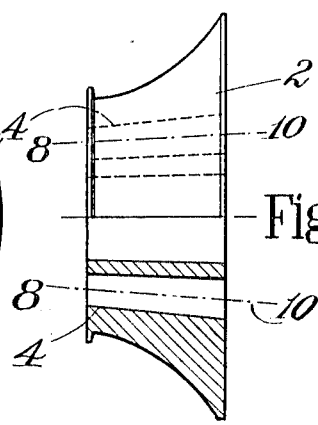
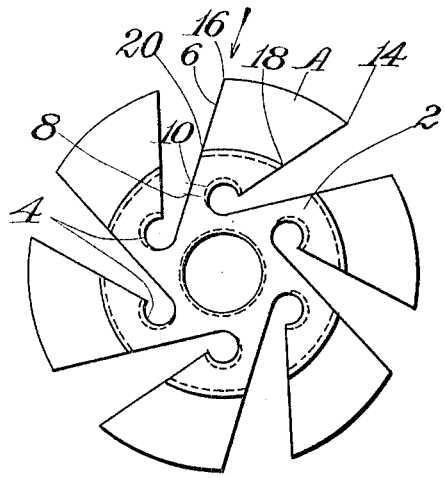
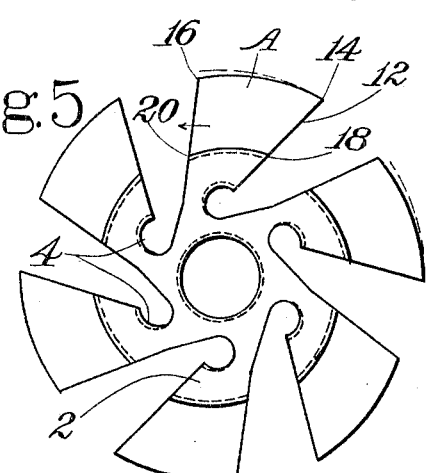
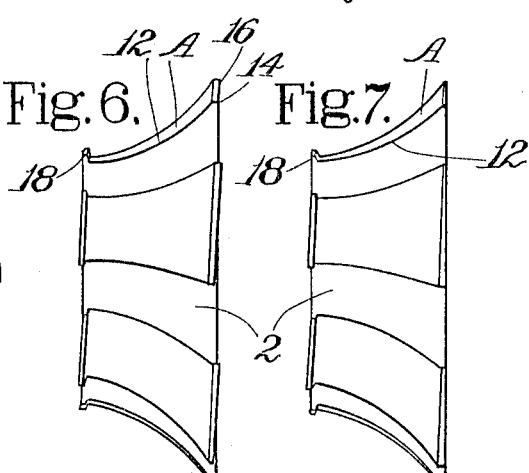

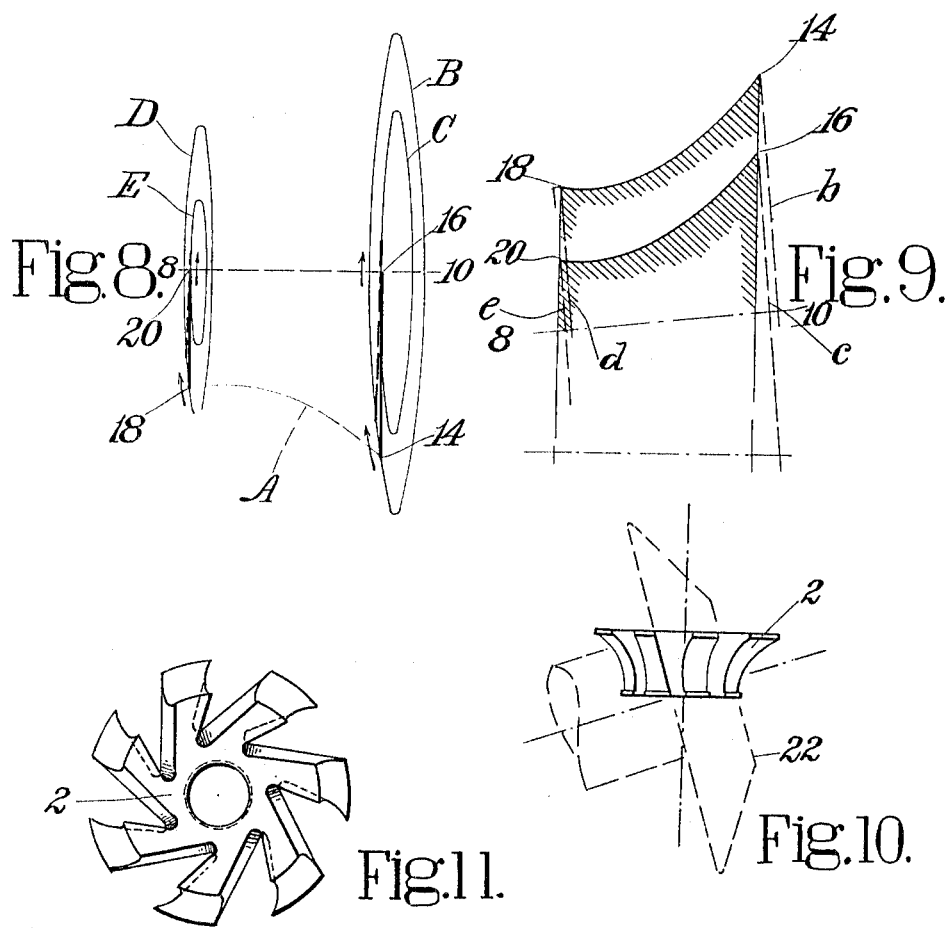

HENRY M. LOOMER, OF BEVERLY, MASSACHUSETTS, ASSIGNOR TO UNITED SHOE MACHINERY COMPANY, OF PATERSON, NEW JERSEY, A CORPORATION OF NEW JERSEY.

CUTTER.

1,105,672.   Specification of Letters Patent.   Patented Aug. 4, 1914.

Application filed February 25, 1914. Serial No. 821,026.

*To all whom it may concern:*

Be it known that I, HENRY M. LOOMER, a citizen of the United States, residing at Beverly, in the county of Essex and State of Massachusetts, have invented certain Improvements in Cutters, of which the following description, in connection with the accompanying drawings, is a specification, like reference characters on the drawings indicating like parts in the several figures.

This invention relates to rotary cutters of the type commonly used in the manufacture of boots and shoes for the purpose of trimming the edges of the soles. It has been the usual practice for a great many years to employ for this purpose a cutter made by forming a circular blank or disk of metal with its peripheral surface shaped to give the desired contour to the edge of the sole and then slotting this disk transversely to form in it a circumferential series of teeth of the desired number, these teeth then being operated upon to give them the necessary clearance. Two methods have been employed for producing the clearance, one consisting in "backing off" the teeth in the well-known manner, and the other, in tipping back the teeth. According to the latter method, the teeth are so shaped in the slotting operation as to form a thin and consequently a weak portion near the base of each tooth, which allows the tooth to be bent or tipped backwardly by means of a tool of proper shape. This operation of course throws the peripheral face of the tooth into an eccentric position with the forward or cutting edge at a greater distance from the axis of the cutter than the parts of the tooth behind said edge, thus giving the cutting edge the required clearance. This type of cutter is described more in detail in United States Letters Patent No. 212,971, granted March 4, 1879, and is commonly referred to as a "tipped back" cutter. It will be evident that if the peripheral contour of a cutter of this type were such that a portion of the cutting edge of each tooth extended substantially parallel to the axis of the cutter, while another portion of the cutting edge extended at right angles to the axis of the cutter, the former portion would be given a clearance by the tipping back operation but the latter portion would not be given such a clearance, for the reason that the face of the cutter back of this part of the cutting edge would be parallel to the direction in which the tooth was tipped.

It is very common, particularly in trimming the edges of the shank portions of shoe soles, to employ a cutter in which the cutting edge of each tooth comprises portions lying at different radial distances from the axis of the cutter. In other words the cutter is larger at one end than at the other, and its peripheral face usually is concave in transverse contour or else has sharply inclined portions so that it will form a beveled or rounded edge on the sole. In such a cutter the clearance of the inclined portion of the cutting edge is less than the clearance of the part of the edge that extends substantially parallel with the axis of the cutter, and the clearance of the inclined part of the edge decreases as the angle of inclination increases. This variation in clearance renders cutters of this character open to two objections: First, that the inclined part of the cutting edge cuts much less freely than the straight or horizontal part of the edge and drags or rubs against the work sometimes sufficiently to burn or discolor the stock that is being trimmed; and second, that the inclined part of the cutter tends to crowd the work toward the smaller end of the cutter and thus increases the difficulty of guiding the shoe properly for the trimming operation. It is the chief object of the present invention to overcome these defects.

The invention will be readily understood from the following description, reference being made to the accompanying drawings, in which—

Figure 1 is a view in end elevation of a cutter blank after the first operations have been performed upon it; Fig. 2 is a side elevation partly in section of the blank shown in Fig. 1; Figs. 3 and 4 are end and side elevations, respectively, of the cutter blank after it has been slotted; Figs. 5 and 6 are end and side elevations, respectively, of the cutter after the teeth have been tipped or bent back; Fig. 7 is a side elevation of a completed cutter; Figs. 8 and 9 are diagrammatic views showing the movement of a tooth produced by the tipping back operation; Fig. 10 is a plan view showing a method of slotting which is practised to produce a modified form of cutter; Fig. 11 is an end elevation of the cutter shown in Fig. 10; Fig. 12 is an end elevation of the cutter shown in Fig. 11 but showing the teeth tipped back; and Fig. 13 is a side elevation of the cutter shown in Figs. 11 and 12 after it has been completed.

The cutter blank 2 shown in Fig. 1 is made in the usual manner, the periphery of this blank being given a transverse contour which is the complement of the contour that it is desired to give to the sole edge. The blank shown is much larger at one end than at the other, as will be seen from an inspection of Fig. 2, and it has a peripheral contour which is very common in cutters intended for trimming the edges of the shank portions of shoe soles. Several holes 4 are drilled through the blank from end to end, the number of these holes being equal to the number of teeth that the cutter is to have. These holes are inclined slightly from the large end toward the small end of the cutter; that is, they are farther from the axis of the cutter at its large end than at its small end. The blank is next slotted in the usual manner to form the teeth of the cutter, these slots preferably being parallel with the axis of the cutter so that the blanks may be slotted in gangs. Each of the slots breaks into one of the holes 4, as shown in Fig. 3, so that, when the slotting is completed, each hole forms the bottom of a slot. I prefer to do the slotting in such a manner that the back face 6 of each tooth will be tangent to the hole 4, into which it breaks, at the side nearest the bore or axis of the cutter; and since the slots are parallel to the axis of the cutter while the holes 4 are slightly inclined with relation to the axis, I prefer to taper the holes, making them somewhat larger at the large end of the cutter than at the small end so that the tangential relationship of the hole to the slot will be preserved throughout the length of the cutter. The next operation on the cutter is to bend each tooth backwardly. It will be evident from an inspection of Figs. 3 and 5 that the thinnest and consequently the weakest part of each tooth, as for instance the tooth indicated at A, is substantially opposite the point 8 at the small end of the cutter and about opposite the point 10 at the large end of the cutter. Consequently, when this tooth is tipped in the direction indicated by the arrow in Fig. 5, it will bend about the line 8—10 (see Figs. 2 and 3) as an axis. The tooth should be bent far enough to bring it substantially into the position in which it is shown in Fig. 5, in which the peripheral face of the tooth will be eccentric to the axis of the cutter and the forward or cutting edge 12 will be higher or farther away from the axis than the rear edge of the tooth.

In cutters as heretofore made the teeth have been so shaped that the weak part or line of bend of each tooth was parallel to the axis of the cutter, whereas in the present arrangement the line of bend is along the line 8—10, as just stated, which line lies at a slight angle to the axis of the cutter. The effect of this arrangement will be readily understood from an inspection of Figs. 8 and 9, it being understood that, in Fig. 9, the front and rear faces of the tooth A are shown lying in a common plane for the purpose of showing the relative positions of the four corners of the tooth with reference to the axis of the cutter and the axis 8—10; while Fig. 8 is a horizontal projection of the tooth A on a plane at right angles to the arrow in Fig. 3. In these figures the front and rear corners of the large end of the tooth are indicated, respectively, at 14 and 16, while the corresponding corners of the small end of the tooth are indicated, respectively, at 18 and 20. Since this tooth swings about the line 8—10 during the tipping back operation, and since this line is inclined with relation to the axis of the cutter, it will be evident that the point 14 (see Figs. 5, 6, 8 and 9) will swing on the radius $b$, Fig. 8, while the point 16 will swing on the radius $c$, Fig. 9. Similarly the point 18 will swing on the radius $d$ and the point 20 on the radius $e$. The paths which the points 14 and 16 would take, if the tooth could complete its revolution about the line 8—10, are indicated in projection by the ellipses B and C, respectively, in Fig. 8, while the corresponding paths of the points 18 and 20 are indicated, respectively, by the ellipses D and E, Fig. 8. From an inspection of Fig. 8 it will be evident that during the tipping back movement of the tooth A (in which it moves from the full line to the dotted line position), the point 14 will swing in laterally toward the body of the cutter, while the point 16 will swing slightly outwardly away from the end of the cutter, these relative lateral movements being due to the fact that the point 14 travels along a part of the ellipse B that swings inwardly to the left of the plane of the end face of the cutter, while the point 16 moves along the part of the ellipse C that is almost parallel to the end face of the cutter but still swings slightly away from said face. In a similar manner the point 18 at the smaller end of the tooth will swing out slightly while the point 20 will swing in slightly, the lateral movements of the points 18 and 20 at the small end of the cutter, however, being much less than the corresponding lateral movements of the points 14 and 16 at the large end of the cutter, because of the much shorter radii of the points 18 and 20.

It will now be clear that, while the tipping back operation gives the usual radial clearance to the cutting edge of the tooth A, it also gives to the inclined part of the cutting edge a lateral clearance due to the lateral movements of the points 14 and 16 during the tipping back operation, as above described. It will also be clear that this lateral clearance is produced by tipping the tooth about a line of bend that lies at an angle to the axis of the cutter. The same effect, of course, is produced when each of the other teeth is tipped back. The lateral clearance given to the inclined part of each tooth in this manner enables this part of the tooth to cut much more freely than would otherwise be possible, and it thus obviates the dragging and rubbing action heretofore mentioned. This lateral clearance also materially reduces the crowding action above mentioned and thus substantially reduces the effort necessary to guide a shoe properly for the trimming operation.

While the extremities 18 and 20 of the lip of the tooth A are relatively moved in such a manner as to reduce slightly the lateral clearance of the lip, this part of the cutter performs so little work and its surface recedes toward the axis of the cutter so rapidly behind the cutting edge, causing only a very small part of the length of the lip to come in contact with the work, that the decrease in lateral clearance of the lip is not sufficient to be appreciable.

The cutter can be used satisfactorily in the form in which it is shown in Figs. 5 and 6; but, inasmuch as the tipping back operation throws the points 14 and 16 out of the plane of the face of the cutter at its large end, I usually prefer to grind off this end of the cutter to form a smooth face, as indicated in Fig. 7.

In slotting the blank 2 to produce the cutter above described, the milling cutter, which forms the slots, is arranged with its axis at right angles to the axis of the blank and the cutter is then fed through the blank in a direction parallel to the axis of the blank. In this construction the angular line of bend is obtained primarily by the drilling operation.

A modified construction is shown in Figs. 10 to 13, inclusive; and according to this embodiment of the invention the milling cutter, instead of being set with its axis at right angles to the axis of the cutter, has its axis swung slightly in a counter-clockwise direction, as the parts are shown in Fig. 10. In this figure, 2 indicates the cutter blank being slotted and 22 indicates the milling cutter which does the slotting. The cutter and blank, after being set in substantially the relationship shown in Fig. 10, are then relaitvely moved to feed the cutter through the blank in a direction parallel to the plane of rotation of the milling cutter.

In a cutter slotted as shown in Figs. 3 and 4, the front face of each tooth is tangent to a cylinder co-axial with the cutter and extending through the cutter; but in a cutter slotted as shown in Fig. 10 the front faces of the teeth will be tangent to a cone extending co-axially through the cutter with its base at the large end of the cutter. A cutter formed in this manner will appear substantially as shown in Fig. 11 after the slotting operation has been completed. It is obvious from an inspection of this figure that each tooth is so shaped that it has a line of bend lying at an angle to the axis of the cutter. In Fig. 12, which shows the cutter of Fig. 11 after the teeth have been bent back, the line of bend of the tooth B is indicated by the line connecting the points 7 and 9. When this tooth is tipped back about the line 7—9, the tooth is given a lateral as well as a radial clearance for the reasons above described in connection with Figs. 8 and 9. This cutter, when completed and faced off, appears substantially as shown in Fig. 13.

Having thus described my invention, what I claim as new and desire to secure by Letters Patent of the United States is:—

1. A rotary cutter of the tipped back type, having a plurality of teeth arranged in a circumferential series, the cutting edge of each tooth comprising portions lying at different radial distances from the axis of the cutter and each tooth being tipped back about a line lying at such an angle with relation to the axis of the cutter as to give the tooth a lateral as well as a radial clearance.

2. A rotary cutter of the tipped back type larger at one end than at the other, and having a plurality of teeth arranged in a circumferential series, each of said teeth being shaped to provide a line of bend lying at a greater distance from the axis of the cutter at the large end than at the small end of the cutter and being tipped back about said line.

3. A rotary cutter of the tipped back type, having a plurality of teeth arranged in a circumferential series, said cutter being slotted substantially parallel to its axis to form said teeth, the cutting edge of each tooth comprising portions lying at different radial distances from the axis of the cutter, and each tooth being shaped to provide a line of bend lying at such an angle with relation to the axis of the cutter that the tipping back operation gives the tooth a lateral as well as a radial clearance and being tipped back about said line.

In testimony whereof I have signed my name to this specification in the presence of two subscribing witnesses.

HENRY M. LOOMER.

Witnesses:
ELMER B. GRUSH,
NORMAN C. HUSSEY.